United States Patent [19]

Hoelsaeter

[11] Patent Number: 5,706,149

[45] Date of Patent: Jan. 6, 1998

[54] MAGNETIC HEAD POSITIONING ARRANGEMENT

[75] Inventor: Håvard Hoelsaeter, Oslo, Norway

[73] Assignee: Tandberg Data ASA, Oslo, Norway

[21] Appl. No.: 657,328

[22] Filed: Jun. 3, 1996

[51] Int. Cl.⁶ ...................................... G11B 5/55
[52] U.S. Cl. ........................................ 360/106
[58] Field of Search ........................ 360/105, 106, 360/109; 369/223, 244

[56] References Cited

U.S. PATENT DOCUMENTS

| | | | |
|---|---|---|---|
| 4,491,890 | 1/1985 | Rudi | 360/106 |
| 4,609,959 | 9/1986 | Rudi | 360/106 |
| 4,747,004 | 5/1988 | Kukreja et al. | 360/106 |
| 4,750,067 | 6/1988 | Gerfast | 360/106 |
| 4,779,149 | 10/1988 | Watanabe | 360/109 X |
| 4,833,558 | 5/1989 | Baheri | 360/106 |
| 5,105,322 | 4/1992 | Steltzer | 360/106 |
| 5,179,486 | 1/1993 | Kraemer et al. | 360/106 |
| 5,191,495 | 3/1993 | Takahara | 360/106 |
| 5,414,578 | 5/1995 | Lian et al. | 360/106 |
| 5,438,469 | 8/1995 | Rudi | 360/109 |
| 5,448,438 | 9/1995 | Kasetty | 360/106 |

Primary Examiner—Robert S. Tupper
Assistant Examiner—William J. Klimowicz
Attorney, Agent, or Firm—Hill, Steadman & Simpson

[57] ABSTRACT

A device for positioning a magnetic head to magnetic tape which includes two spaced apart plates connected by two front cylindrical outriggers and a rear threaded shaft. A magnetic head assembly is resiliently held between the threaded shaft and the two outriggers by a beam type plate spring having on a back side a nut or threaded follower which engages the threaded shaft. A stepper motor connected to a worm gear drives the threaded shaft into axial rotation which by being meshed with the follower raises and lowers the follower, and thus the magnetic head, with respect to the threaded shaft. The magnetic head provides two V-shaped regions which guide head movement on one outrigger and a flat bearing surface on the opposite side to slide on the second outrigger, forming a precisely set three point guiding of the magnetic head.

12 Claims, 4 Drawing Sheets

MAGNETIC HEAD POSITIONING ARRANGEMENT

BACKGROUND OF THE INVENTION

The present invention relates to a device for positioning a magnetic head to various tracks of a magnetic tape and a magnetic tape recording device.

A device for positioning a magnetic head to tracks of a magnetic tape in a magnetic tape recorder is described for example in U.S. Pat. No. 4,609,959 to Rudi. In this patent, a device is disclosed for positioning a magnetic head to various tracks of a magnetic tape, the magnetic head disposed on a magnetic head carrier, and positionable upon employment of a worm drive means and a screw drive means. The worm drive is formed of a worm spindle gear driven by a drive motor and an allocated worm wheel gear. The screw drive is formed of an inside thread of the worm wheel and an outside associated thread on a shaft, the shaft mounted in a frame-fixed manner to the head assembly frame of the tape recorder. The magnetic head carrier is displacably disposed on the shaft and prevented from rotating during rotation of the worm wheel so that head carrier follows the axial motion of the worm wheel.

The shaft for supporting the head in this reference is journaled by two bearings. It has been found that clearance or play between the shaft and the bearings can adversely affect the azimuth and zenith positioning of the head, via the head carrier. Particularly, since the head carrier extends outward from the center line of the supporting shaft, an overturning moment is created tending to tip the head. Additionally, force on the head due to the moving tape can create a further moment about an axis perpendicular to the shaft and extending between the shaft and the head. These two moments can result in zenith and azimuth misalignments of the magnetic head. Additionally, a precise securement of the magnetic head to the carrier must be assured for precision alignment of the magnetic head to the tape.

SUMMARY OF THE INVENTION

It is an object of the present invention to provide a magnetic head mounting and positioning arrangement which overcomes drawbacks of the prior art. It is an object of the invention to provide a head mounting and positioning mechanism which provides a constant surface contact between a tape passing over the magnetic head. It is an object of the invention to provide a head positioning device with a quick position response. It is an object of the invention to provide a head mounting and positioning arrangement which maintains precise zenith and azimuth control.

It is an object of the invention to provide a head mounting and positioning apparatus which is easily manufactured with minimum parts and minimum precision machining operations.

The objects of the invention are achieved in a head mounting and positioning apparatus having a base platform and a top plate in facing parallelism connected by two cylindrical columns or "outriggers", and a shaft having external screw threads and journaled into the base plate and the top plate by bearings. The outriggers and shaft are arranged in a triangular layout. The shaft provides fixed thereto at a lower end a toothed gear, and the apparatus includes a worm gear in mesh therewith, driven by a head stepper motor. Rotation of the stepper motor rotates the worm gear and thus the tooth gear and thus the threaded shaft. A magnetic head assembly having a mounting or platform fixed thereto is installed in a center portion of the arrangement. The head assembly includes a first bearing region pressed against one of the outriggers and a second bearing region pressed against the second of the outriggers. An opposite side of the platform holds a head pressure spring in the form of a resilient beam. Attached to the spring is a head position "follower" or "nut" which engages the external threads of the shaft and functions as the vertical driving unit of the head assembly and platform together.

The first bearing region of the head assembly includes a localized flat bearing surface for pressing against the first outrigger. The second bearing region includes two V-shaped profile bearing surfaces for pressing against the second outrigger and thereby also positively fixing the lateral position of the head assembly with respect to the base plate for lateral position and zenith and azimuth angle control. The first outrigger in conjunction with the second outrigger sets the rotational position and projection of the head assembly past the outriggers. The outriggers and bearing regions are precisely machined or formed to set precise reference positions, and zenith, azimuth, and rotational orientation of the head assembly.

When the head assembly and platform are installed, the spring presses the platform and head assembly against the outriggers and the V-shaped region and the flat bearing surface assures the rotational, angular and lateral correct position of the head assembly with regard to the base plate. The resilient loading of the head assembly against the outriggers assures an accurate planar deployment of the head assembly. The magnetic tape is partially wrapped around the outriggers to press against magnetic heads of the head assembly at the desired pressure. The heads can be positioned upwardly and downwardly by actuating the head stepper motor to rotate the threaded shaft and translate the follower up and down to move the platform and the head assembly.

The containment of the outrigger in the V-shaped region of the head assembly provides for very precise and accurate sliding vertical positioning of the head while maintaining the correct zenith, azimuth and rotational (about the vertical axis) angles of the head with regard to the tape which passes closely over the same outrigger. The two V-shaped surfaces and the flat bearing surface provide generally a three point precision planar fixation of the head.

The arrangement of the outriggers and screwed shaft holding the head assembly with platform attached provides for a compact construction of a tape head mounting and positioning device. Due to the arrangement, the screwed shaft can be located in close proximity to the head, eliminating the overhang drawback of U.S. Pat. No. 4,609,959. Because the head bearing surfaces set the precise positioning of the head with respect to the outriggers which also guide the tape, a required precise connection of a head to a head carrier is avoided. Also, because of the close proximity of the outriggers to the heads, the heads need not be unduly long to support the tape over its width when accessing extreme upper or lower tracks, the close outriggers can adequately support the tape in its vertical orientation.

DETAILED DESCRIPTION OF THE PREFERRED EMBODIMENTS

Figure 1:
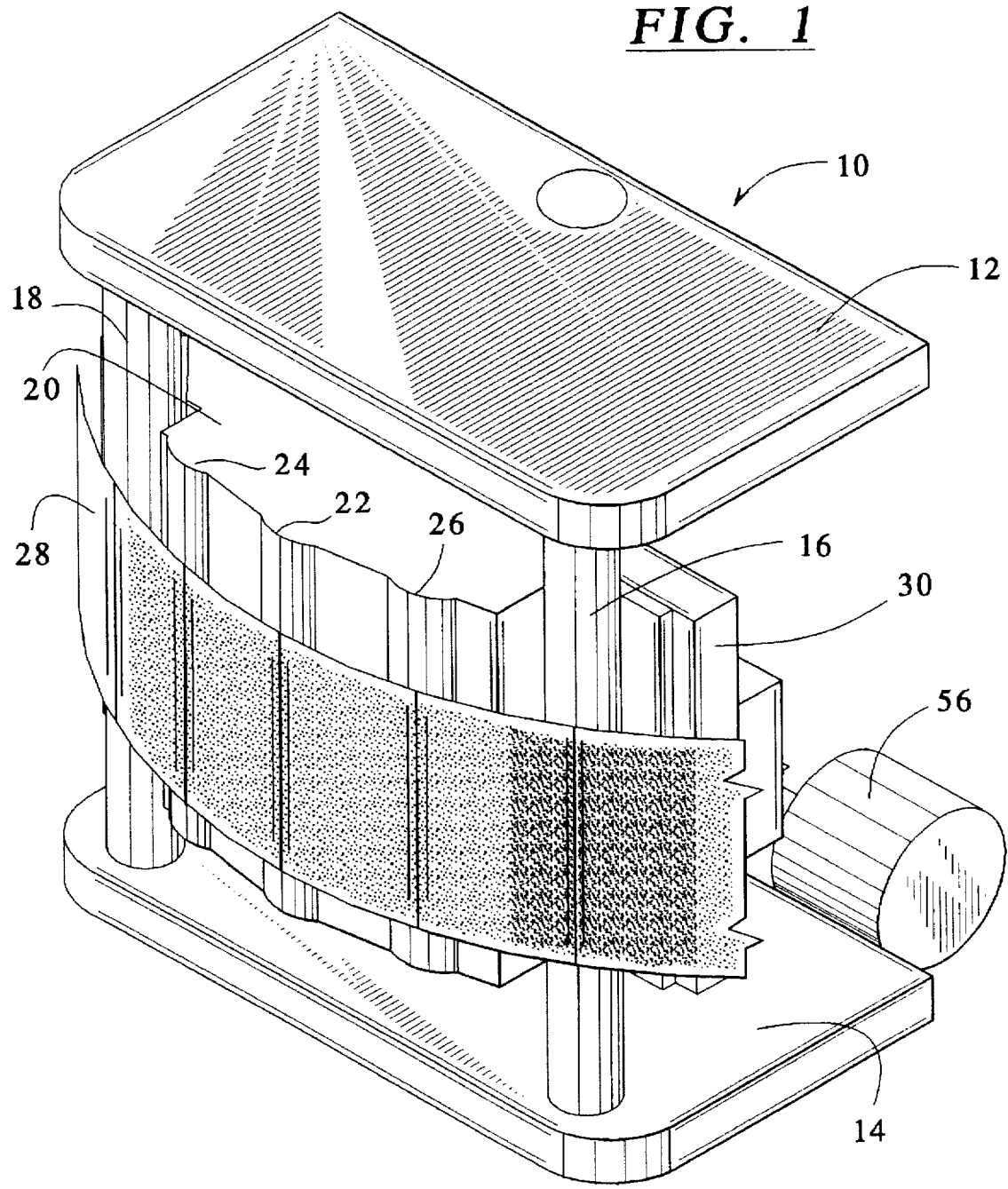
FIG. 1 is a front perspective view of a head positioning device of the present invention.

FIG. 1 illustrates a head positioning device 10 of the present invention. This device would typically be mounted within a tape drive which accesses longitudinally running tracks of a multi-track tape. By positioning the head up and down different parallel tracks can be accessed.

The device includes a top plate 12, a parallel spaced bottom plate 14, a first upstanding outrigger 16 having a cylindrical shape, and a second outrigger 18 also having a cylindrical shape. The outriggers 16, 18 connect the top plate 12 with the bottom plate 14 in spaced apart parallelism. It should be noted that although the shape of the top plate 12 and the bottom plate 14 shown in FIG. 1 provides for a compact and advantageous arrangement, these plates 12, 14 can be replaced with larger or differently shaped structural components of the tape drive without departing from the invention.

A magnetic head assembly 20 is arranged partially between the outriggers 16, 18. The head assembly 20 is a conglomerate of for example a read head 22, a first write head 24, and a second write head 26. The two write heads 24, 26 can be used for bidirectional tape operation. Each of the heads 22, 24, 26 has near to its vertical midpoint a magnetic gap 22a, 24a, 26a for reading or writing on magnetic tape 28 (shown in the FIGS. 4 and 5). The head assembly 20 is connected to a mounting or platform 30.

Figure 2:
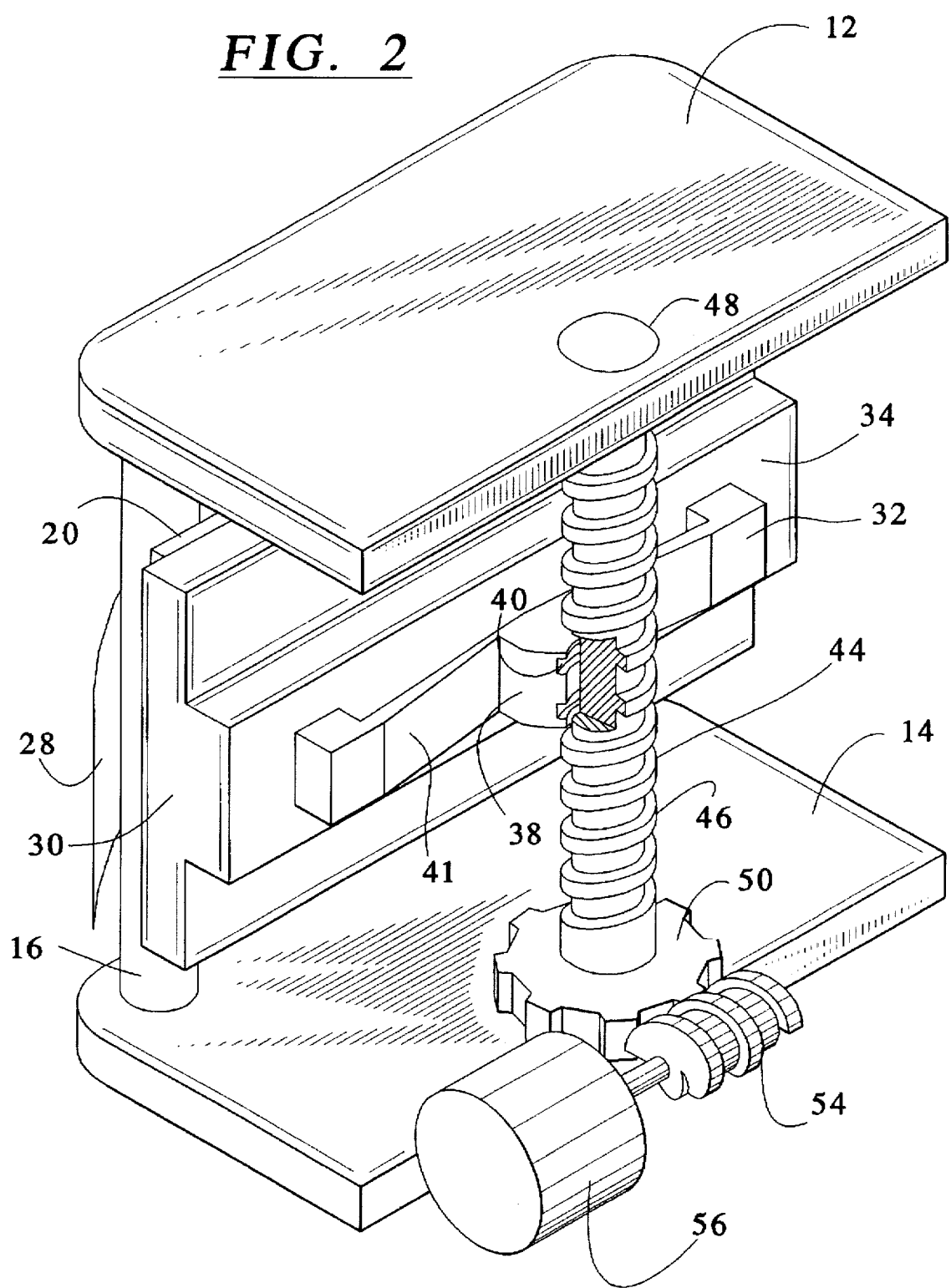
FIG. 2 is a rear perspective view of the device shown in FIG. 1.

FIG. 2 illustrates a rear view of the arrangement of FIG. 1 and further illustrates that the platform 30 has a generally prone T-shaped cross section with a spring assembly 32 mounted on a back side 34 of the platform 30. The spring assembly 32 is in the form of a generally U-shaped beam or plate spring and having a follower or nut 38 connected at its center and facing rearwardly, having exposed threads 40 facing rearwardly. A beam portion 41 of the spring can be a thin metallic element.

A threaded shaft 44 is provided having external threads 46 engaged to the threads 40. The threaded shaft 44 is journaled for rotation in an aperture 48 in the top plate 12 and is similarly joined in the bottom plate 14 (not shown). The rearward distance between the outriggers 16, 18 and the threaded shaft 44 is such that when the head assembly 20 and the platform 30 are assembled against the outrigger 16, 18, the threaded shaft 44 resiliently presses the spring assembly 32, maintaining the threads 46 engaged into the threads 40, and the head assembly 20 firmly pressed against the outriggers 16, 18. The spring mechanism with the plate spring is preferred because it will also give the same spring force on the bearing surfaces regardless of the head position, as opposed to the use of a coil spring, although both are encompassed by the invention.

At a bottom of the threaded shaft 44 is a toothed gear 50 engaged with a worm drive 54 turned by a stepper motor 56. Thus, precise amount of rotation of the stepper motor 56 rotates the worm drive 54 to turn the gear 50, which turns the threaded shaft 44, which, by screw mechanics, elevates or descends the follower 38 with respect to the shaft 44, which raises and lowers the platform 30.

Figure 3:
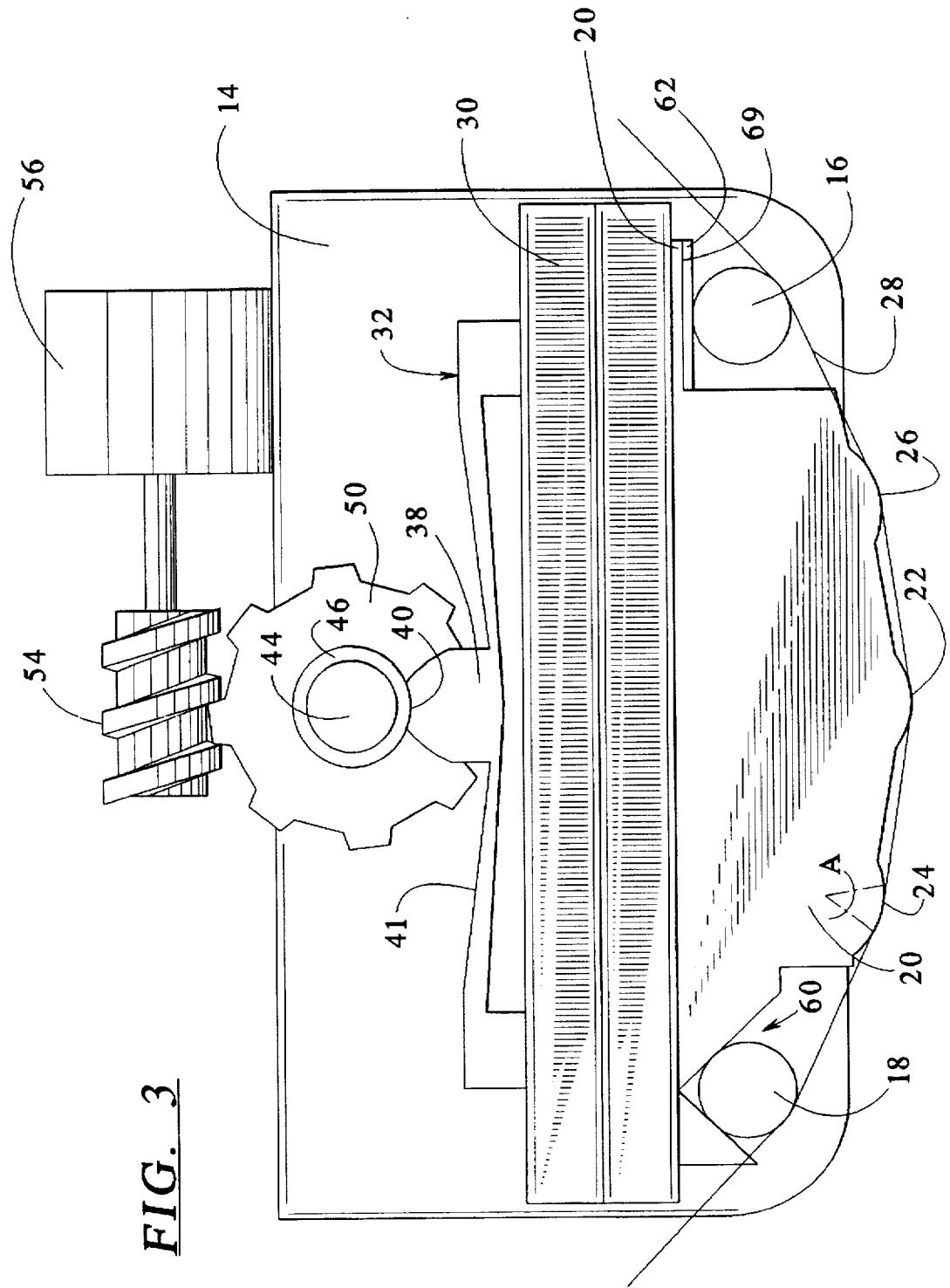
FIG. 3 is a top view of the device shown in FIG. 1.

FIG. 3 illustrates another important feature of the invention. The head assembly 20 provides at one side a V-shaped channel 60 for abutting against and being guided by the second outrigger 18 and a flat bearing surface 62 for abutting against and sliding on the first outrigger 16. The combination of the V-shaped channel 60 and the flat bearing surface 62 positively positions the head for zenith and azimuth angles and rotation angle about a vertical axis.

As shown in FIG. 3, the tape slides on the outriggers 16, 18 which set the correct wrapping angle such as "A" for the heads 22, 24, 26. Additionally, the tape will also have contact with and support from the outriggers 16, 18 independent of the head position. This eliminates the requirement that a one-channel head is a minimum twice the width of the tape.

Figure 4:
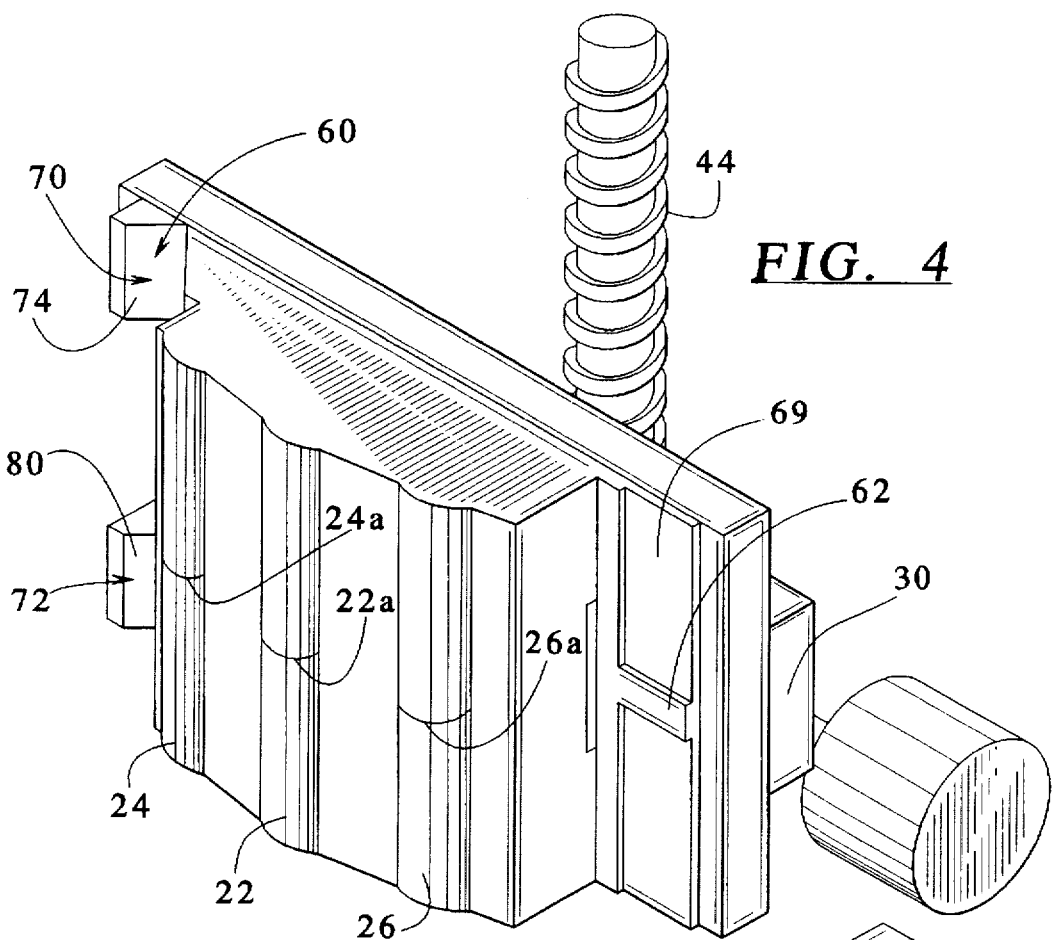
FIG. 4 is a right side partial perspective view of the device of FIG. 1.
Figure 5:
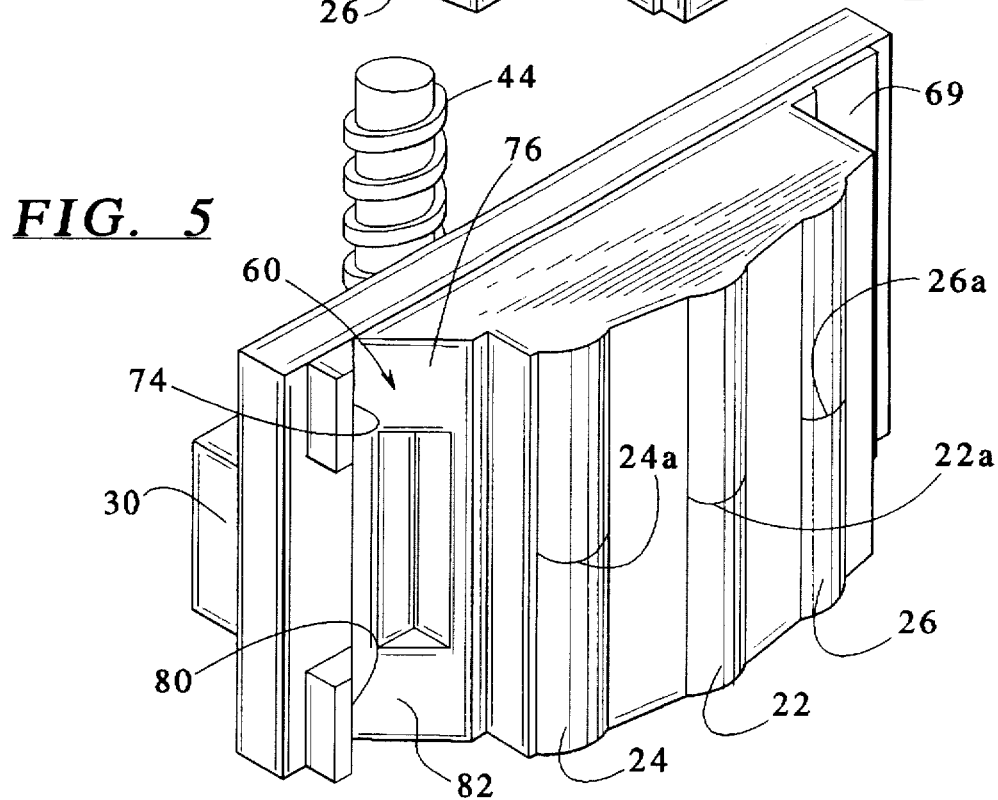
FIG. 5 is a left side partial perspective view of the device of FIG. 1.

FIG. 4 illustrates the bearing surface 62 as being a horizontally disposed raised rectangle at an approximate vertical center point of a shoulder region 69 of the head assembly 20. The V-shaped channel 60 provides a top V section 70 and a bottom V section 72. The top V section comprises wall portions 74 shown in FIG. 4 and wall portions 76 shown in FIG. 5. The bottom V section 72 is composed of wall portion 80 shown in FIG. 4 and wall portion 82 shown in FIG. 5. Thus, a three point loading is achieved by: the top V section 70, the bottom V section 72, and the bearing surface 62. The surfaces of wall portions 74, 76, 80, 82 and the bearing surface 62 are precisely formed or machined and the outriggers 16, 18 are precisely formed or machined. By using a three point loading, a precise planar orientation of the head can be achieved which is more easily precision manufactured.

These reference points, top V section 70, bottom V section 72 and bearing surface 62 can be made early in the production process and later used for all internal alignment. Since the head assembly 20 directly serves as the precision reference for the orientation of the heads, precision gluing of the head assembly on a platform is not required.

Although the present invention has been described with reference to a specific embodiment, those of skill in the art will recognize that changes may be made thereto without departing from the scope and spirit of the invention as set forth in the appended claims.

I claim as my invention:

1. A device for positioning a magnetic head from track to track on a magnetic tape, the device comprising:

a first plate and a second plate arranged in spaced apart parallelism;

a first outrigger and a second outrigger connecting said first plate and said second plate;

a magnetic head assembly having at least one magnetic head and having spaced apart first and second bearing regions on a front surface thereof for sliding on said first outrigger and said second outrigger respectively when said magnetic head is moved from track to track;

a follower mounted to a back of said head assembly and having exposed threads;

a threaded shaft arranged behind said magnetic head and spanning between said first plate and said second plate, said threaded shaft rotatable axially and engaged to the exposed threads of said follower; and a motor means for turning the threaded shaft axially to cause by screw mechanics raising and lowering of said follower wherein said outriggers comprise cylindrical members arranged perpendicularly to said first and second plates and said head assembly further comprises a further magnetic head, said magnetic head and said further magnetic head being raised partial cylinder formations on a surface of said head assembly, said outriggers extending forwardly and wrapped by said magnetic tape to set a wrap angle of said magnetic tape onto said magnetic head and said further magnetic head.

2. The device according to claim 1, wherein said motor means comprises a stepper motor connected to a worm gear, and said threaded shaft further comprises a toothed gear fixed thereto and in mesh with said worm gear such that rotation of said stepper motor rotates said threaded shaft axially.

3. The device according to claim 1, further comprising a spring arranged between said magnetic head assembly and said follower to resiliently bias said head assembly against said outriggers.

4. A device for positioning a magnetic head from track to track on a magnetic tape, the device comprising:

a first plate and a second plate arranged in spaced apart parallelism;

a first outrigger and a second outrigger connecting said first plate and said second plate;

a magnetic head assembly having at least one magnetic head and having spaced apart first and second bearing regions on a front surface thereof for sliding on said first outrigger and said second outrigger respectively when said magnetic head is moved from track to track;

a follower mounted to a back of said head assembly and having exposed threads;

a threaded shaft arranged behind said magnetic head and spanning between said first plate and said second plate, said threaded shaft rotatable axially and engaged to the exposed threads of said follower; and a motor means for turning the threaded shaft axially to cause by screw mechanics raising and lowering of said follower wherein said first and second bearing regions comprise a flat bearing surface on one side of said head and a V-shaped channel on an opposite side of said head respectively, said V-shaped channel setting the azimuth and zenith angles of said magnetic head and said V-shaped channel and said flat bearing surface setting the vertical rotation angle of said head with respect to the magnetic tape.

5. The device according to claim 4, wherein said V-shaped channel comprises an upper V-shaped region and lower V-shaped region and said flat bearing surface comprises a rectangular bar located vertically at a position between said upper and lower V-shaped regions, to form a three point bearing arrangement which includes said upper and lower V-shaped region and said flat bearing surface.

6. A device for positioning a magnetic head from track to track on a magnetic tape, the device comprising:

a first plate and a second plate arranged in spaced apart parallelism;

a first outrigger and a second outrigger connecting said first plate and said second plate;

a magnetic head assembly having at least one magnetic head and having spaced apart first and second bearing regions on a front surface thereof for sliding on said first outrigger and said second outrigger respectively when said magnetic head is moved from track to track;

a follower mounted to a back of said head assembly and having exposed threads;

a threaded shaft arranged behind said magnetic head and spanning between said first plate and said second plate, said threaded shaft rotatable axially and engaged to the exposed threads of said follower; and a motor means for turning the threaded shaft axially to cause by screw mechanics raising and lowering of said follower wherein said outriggers comprise cylindrical columns, and said head assembly further comprises two additional magnetic heads protruding forwardly of said outriggers, said outriggers positioned forwardly to an extent to set the wrap angle of said tape onto said additional magnetic heads by deflecting the tape partially wrapped on said outriggers.

7. The device according to claim 6, wherein said magnetic head and said two additional magnetic heads comprise three curved raised formations extending lengthwise transversely to a longitudinal direction of said magnetic tape and spaced apart, with a center one of said raised formations forwardly leading respective side raised formations.

8. A device for positioning a magnetic head from track to track on a tape, comprising:

a first plate and a second plate arranged in spaced apart parallelism;

a first outrigger and a second outrigger connecting said first and second plates;

a magnetic head assembly having at least one magnetic head, and having on one side thereof two V-shaped guides and on another side a flat bearing surface, said two V-shaped guides receiving said second outrigger, said second outrigger guiding movement of said magnetic head assembly along said second outrigger, and said flat bearing surface pressing and slidable along said first outrigger;

a means for biasing said magnetic head assembly against said first and second outriggers; and a means for selectively moving said magnetic head assembly along a length of said outriggers.

9. The device according to claim 8, wherein said means for biasing is arranged between said magnetic head assembly and said means for selectively moving.

10. The device according to claim 9, wherein said means for biasing comprises a plate spring having a beam portion mounted at opposite ends to said magnetic head assembly, and having a threaded follower connected thereto, and said means for selectively moving comprises a threaded shaft in mesh with said follower, a gear means connected to said shaft for turning said shaft to move said follower by screw mechanics, and a motor for turning said gear means.

11. The device according to claim 8, wherein said outriggers are cylindrical rods and said V-shaped guides set the azimuth angle of said magnetic head.

12. The device according to claim 11, wherein said magnetic head assembly comprises three magnetic heads as protrusions, a center one of said heads protruding outwardly from respective side ones of said three magnetic heads, said outriggers set forwardly sufficiently to act as tape guides to set a wrap angle of said tape on all three magnetic heads.

* * * * *